United States Patent
Snape (10) Patent No.: US 11,236,675 B2
(45) Date of Patent: Feb. 1, 2022

(54) GAS TURBINE ENGINE WITH INTERCOOLED COOLING AIR AND TURBINE DRIVE

(71) Applicant: United Technologies Corporation, Farmington, CT (US)

(72) Inventor: Nathan Snape, Tolland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 66 days.

(21) Appl. No.: 16/821,383

(22) Filed: Mar. 17, 2020

(65) Prior Publication Data

US 2020/0224592 A1 Jul. 16, 2020

Related U.S. Application Data

(63) Continuation of application No. 15/269,014, filed on Sep. 19, 2016, now Pat. No. 10,669,940.

(51) Int. Cl.
| | |
|---|---|
| *F02C 7/00* | (2006.01) |
| *F02C 7/18* | (2006.01) |
| *F02C 7/32* | (2006.01) |
| *F02C 6/08* | (2006.01) |
| *F02C 7/36* | (2006.01) |

(Continued)

(52) U.S. Cl.
CPC .............. *F02C 7/185* (2013.01); *F02C 6/08* (2013.01); *F02C 7/18* (2013.01); *F02C 7/32* (2013.01); *F02C 7/36* (2013.01); *F02C 9/18* (2013.01); *F02K 3/06* (2013.01); *F05D 2220/32* (2013.01); *F05D 2260/213* (2013.01); *F05D 2260/4023* (2013.01); *F05D 2260/4031* (2013.01); *Y02T 50/60* (2013.01)

(58) Field of Classification Search
CPC ...... F02C 7/32; F02C 7/36; F02C 9/18; F02C 6/08; F02C 7/18; F02C 7/185
See application file for complete search history.

(56) References Cited

U.S. PATENT DOCUMENTS

| | | | |
|---|---|---|---|
| 2,692,476 | A | 10/1954 | Schaal et al. |
| 3,878,677 | A | 4/1975 | Colvin |
| 4,254,618 | A | 3/1981 | Elovic |

(Continued)

FOREIGN PATENT DOCUMENTS

| | | |
|---|---|---|
| DE | 2852057 | 6/1979 |
| EP | 0447886 | 9/1991 |

(Continued)

OTHER PUBLICATIONS

Dornheim, Michael A., Rolls-Royce Trent 1000 to Drive Boeing 787 Accessories From IP Spool, Aviation Week & Space Technology, Mar. 28, 2005, p. 51, Los Angeles, CA.

(Continued)

*Primary Examiner* — Katheryn A Malatek
(74) *Attorney, Agent, or Firm* — Carlson, Gaskey & Olds, P.C.

(57) ABSTRACT

A gas turbine engine has a compressor section with a downstream most end and a cooling air tap at a location spaced upstream from the downstream most end. The cooling air tap is passed through at least one boost compressor and at least one heat exchanger, and then passed to a turbine section to cool the turbine section. The boost compressor is driven by a driveshaft which is driven by the turbine section. A boost turbine selectively drives the boost compressor.

19 Claims, 4 Drawing Sheets

(51) Int. Cl.
*F02C 9/18* (2006.01)
*F02K 3/06* (2006.01)

(56) References Cited

U.S. PATENT DOCUMENTS

| | | |
|---|---|---|
| 4,539,945 A | 9/1985 | Bosisio |
| 4,882,902 A | 11/1989 | Reigel et al. |
| 5,056,335 A | 10/1991 | Renninger et al. |
| 5,269,135 A | 12/1993 | Vermejan et al. |
| 5,305,616 A | 4/1994 | Coffinberry |
| 5,313,783 A | 5/1994 | Althaus |
| 5,363,641 A | 11/1994 | Dixon et al. |
| 5,392,614 A | 2/1995 | Coffinberry |
| 5,414,992 A | 5/1995 | Glickstein |
| 5,452,573 A | 9/1995 | Glickstein et al. |
| 5,498,126 A | 3/1996 | Pighetti et al. |
| 5,724,806 A | 3/1998 | Horner |
| 5,758,485 A | 6/1998 | Frutschi |
| 5,867,979 A | 2/1999 | Newton et al. |
| 5,918,458 A | 7/1999 | Coffinberry et al. |
| 5,967,461 A | 10/1999 | Farrington |
| 6,050,079 A | 4/2000 | Durgin et al. |
| 6,065,282 A | 5/2000 | Fukue et al. |
| 6,134,880 A | 10/2000 | Yoshinaka |
| 6,430,931 B1 | 8/2002 | Horner |
| 6,487,863 B1 | 12/2002 | Chen et al. |
| 6,612,114 B1 | 9/2003 | Klingels |
| 6,615,574 B1 | 9/2003 | Marks |
| 6,892,523 B2 | 5/2005 | Fetescu et al. |
| 7,237,386 B2 | 7/2007 | Hoffmann et al. |
| 7,246,484 B2 | 7/2007 | Giffin, III et al. |
| 7,284,377 B2 | 10/2007 | Joshi et al. |
| 7,306,424 B2 | 12/2007 | Romanov et al. |
| 7,334,412 B2 | 2/2008 | Tiemann |
| 7,347,637 B2 | 3/2008 | Kubo et al. |
| 7,500,365 B2 | 3/2009 | Suciu et al. |
| 7,552,591 B2 | 6/2009 | Bart et al. |
| 7,698,884 B2 | 4/2010 | Maguire et al. |
| 7,765,788 B2 | 8/2010 | Schwarz |
| 7,823,389 B2 | 11/2010 | Seitzer et al. |
| 7,882,691 B2 | 2/2011 | Lemmers, Jr. et al. |
| 7,886,520 B2 | 2/2011 | Stretton et al. |
| 8,015,828 B2 | 9/2011 | Moniz et al. |
| 8,037,686 B2 | 10/2011 | Lasker |
| 8,087,249 B2 | 1/2012 | Ottaviano et al. |
| 8,181,443 B2 | 5/2012 | Rago |
| 8,307,662 B2 | 11/2012 | Turco |
| 8,350,398 B2 | 1/2013 | Butt |
| 8,397,487 B2 | 3/2013 | Sennoun et al. |
| 8,402,742 B2 | 3/2013 | Roberge et al. |
| 8,434,997 B2 | 5/2013 | Pinero et al. |
| 8,511,967 B2 | 8/2013 | Suciu et al. |
| 8,522,529 B2 | 9/2013 | Martinou et al. |
| 8,572,982 B2 | 11/2013 | Tiemann |
| 8,602,717 B2 | 12/2013 | Suciu et al. |
| 8,621,871 B2 | 1/2014 | McCune et al. |
| 8,727,703 B2 | 5/2014 | Laurello et al. |
| 8,776,952 B2 | 7/2014 | Schwarz et al. |
| 8,814,502 B2 | 8/2014 | Eleftheriou |
| 8,876,465 B2 | 11/2014 | Stretton |
| 8,961,108 B2 | 2/2015 | Bergman et al. |
| 9,234,481 B2 | 1/2016 | Suciu et al. |
| 9,243,563 B2 | 1/2016 | Lo |
| 9,255,492 B2 | 2/2016 | Bacic |
| 9,297,391 B2 | 3/2016 | Rued et al. |
| 9,422,063 B2 | 8/2016 | Diaz |
| 9,429,072 B2 | 8/2016 | Diaz et al. |
| 2003/0046938 A1 | 3/2003 | Mortzheim et al. |
| 2004/0088995 A1 | 5/2004 | Reissig |
| 2005/0172612 A1 | 8/2005 | Yamanaka et al. |
| 2007/0022735 A1 | 2/2007 | Henry et al. |
| 2007/0213917 A1 | 9/2007 | Bruno et al. |
| 2007/0245738 A1 | 10/2007 | Stretton et al. |
| 2008/0028763 A1 | 2/2008 | Schwarz et al. |
| 2008/0230651 A1 | 9/2008 | Porte |
| 2008/0253881 A1 | 10/2008 | Richards |
| 2009/0007567 A1 | 1/2009 | Porte et al. |
| 2009/0090096 A1 | 4/2009 | Sheridan |
| 2009/0145102 A1 | 6/2009 | Roberge et al. |
| 2009/0188234 A1 | 7/2009 | Suciu et al. |
| 2009/0196736 A1 | 8/2009 | Sengar et al. |
| 2009/0226297 A1 | 9/2009 | Yanagi et al. |
| 2009/0272120 A1 | 11/2009 | Tiemann |
| 2010/0043396 A1 | 2/2010 | Coffinberry |
| 2010/0154434 A1 | 6/2010 | Kubota et al. |
| 2011/0036066 A1 | 2/2011 | Zhang et al. |
| 2011/0088405 A1 | 4/2011 | Turco |
| 2011/0120083 A1 | 5/2011 | Giffin et al. |
| 2011/0247344 A1 | 10/2011 | Glahn et al. |
| 2012/0067055 A1 | 3/2012 | Held |
| 2012/0102915 A1 | 5/2012 | Baltas |
| 2012/0124964 A1 | 5/2012 | Hasel et al. |
| 2012/0159961 A1 | 6/2012 | Krautheim et al. |
| 2012/0180509 A1 | 7/2012 | DeFrancesco |
| 2013/0036747 A1 | 2/2013 | Fuchs et al. |
| 2013/0067928 A1 | 3/2013 | Arias Chao et al. |
| 2013/0098059 A1 | 4/2013 | Suciu et al. |
| 2013/0145744 A1 | 6/2013 | Lo et al. |
| 2013/0145774 A1 | 6/2013 | Duong et al. |
| 2013/0186102 A1 | 7/2013 | Lo |
| 2013/0199156 A1 | 8/2013 | Ress, Jr. et al. |
| 2013/0199201 A1 | 8/2013 | Barkowsky et al. |
| 2013/0239583 A1 | 9/2013 | Suciu et al. |
| 2013/0319002 A1 | 12/2013 | Sidelkovskiy et al. |
| 2014/0020506 A1 | 1/2014 | Duong |
| 2014/0137417 A1 | 5/2014 | Silberberg et al. |
| 2014/0196469 A1 | 7/2014 | Finney et al. |
| 2014/0230444 A1 | 8/2014 | Hao et al. |
| 2014/0250898 A1 | 9/2014 | Mackin et al. |
| 2014/0260326 A1 | 9/2014 | Schwarz et al. |
| 2014/0311157 A1 | 10/2014 | Laurello et al. |
| 2014/0341704 A1 | 11/2014 | Fletcher |
| 2014/0352315 A1 | 12/2014 | Diaz |
| 2015/0114611 A1 | 4/2015 | Morris et al. |
| 2015/0275769 A1 | 10/2015 | Foutch et al. |
| 2015/0285147 A1 | 10/2015 | Phillips et al. |
| 2015/0308339 A1 | 10/2015 | Forcier |
| 2015/0330236 A1 | 11/2015 | Beecroft et al. |
| 2015/0354465 A1 | 12/2015 | Suciu et al. |
| 2015/0354822 A1 | 12/2015 | Suciu et al. |
| 2016/0010554 A1 | 1/2016 | Suciu et al. |
| 2016/0131036 A1 | 5/2016 | Bintz et al. |
| 2016/0131037 A1 | 5/2016 | Spangler et al. |
| 2016/0169118 A1 | 6/2016 | Duong |
| 2016/0215732 A1 | 7/2016 | Malecki |
| 2016/0237901 A1 | 8/2016 | Zelesky et al. |
| 2016/0237906 A1 | 8/2016 | Suciu et al. |
| 2016/0312797 A1 | 10/2016 | Suciu et al. |
| 2016/0341125 A1 | 11/2016 | Kraft et al. |
| 2016/0369697 A1 | 12/2016 | Schwarz et al. |
| 2017/0009657 A1 | 1/2017 | Schwarz et al. |
| 2017/0044980 A1 | 2/2017 | Duesler et al. |
| 2017/0044982 A1 | 2/2017 | Duesler et al. |
| 2017/0152765 A1 | 6/2017 | Uechi et al. |
| 2017/0159568 A1 | 6/2017 | Sennoun et al. |
| 2017/0167388 A1 | 6/2017 | Merry et al. |
| 2017/0175632 A1 | 6/2017 | Hanrahan et al. |
| 2017/0184027 A1 | 6/2017 | Moniz et al. |
| 2017/0204787 A1 | 7/2017 | Duesler et al. |
| 2018/0306109 A1 | 10/2018 | Marcucci et al. |

FOREIGN PATENT DOCUMENTS

| | | |
|---|---|---|
| EP | 0469825 | 2/1992 |
| EP | 0608142 | 7/1994 |
| EP | 0903484 | 3/1999 |
| EP | 1314872 | 5/2003 |
| EP | 1944475 | 7/2008 |
| EP | 2085599 | 8/2009 |
| EP | 2128023 | 12/2009 |
| EP | 2362081 | 8/2011 |
| EP | 2540991 | 1/2013 |
| EP | 2584172 | 4/2013 |
| EP | 2604825 | 6/2013 |

(56) References Cited

FOREIGN PATENT DOCUMENTS

| | | |
|---|---|---|
| EP | 2733322 | 5/2014 |
| EP | 2865981 | 4/2015 |
| EP | 2942490 | 11/2015 |
| EP | 3085923 | 10/2016 |
| EP | 3085924 | 10/2016 |
| EP | 3121411 | 1/2017 |
| FR | 2851295 | 8/2004 |
| GB | 1244340 | 8/1971 |
| GB | 2152148 | 7/1985 |
| JP | H1136889 | 2/1999 |
| WO | 2003037715 | 5/2003 |
| WO | 2008082335 | 7/2008 |
| WO | 2013154631 | 10/2013 |
| WO | 2014046713 | 3/2014 |
| WO | 2014092777 | 6/2014 |
| WO | 2014120125 | 8/2014 |

OTHER PUBLICATIONS

U.S. Appl. No. 15/232,101.
U.S. Appl. No. 14/964,984.
U.S. Appl. No. 14/967,446.
U.S. Appl. No. 15/069,197.
U.S. Appl. No. 15/269,014.
U.S. Appl. No. 15/373,072.
European Search Report for European Application No. 16166707.6 dated Sep. 26, 2016.
European Search Report for European Application No. 16166724.1 dated Sep. 26, 2016.
European Search Report for European Patent Application No. 16154635.3 dated Jul. 6, 2016.
European Search Report for European Application No. 16155316.9 dated Jun. 30, 2016.
European Search Report for Application No. 16170021.6 dated Oct. 11, 2016.
European Search Report for Application No. 16174862.9 dated Nov. 7, 2016.
European Search Report for European Application No. 16175531.9 dated Nov. 15, 2016.
European Search Report for European Application No. 16175533.5 dated Nov. 15, 2016.
European Search Report for European Application No. 16175552.5 dated Nov. 17, 2016.
European Search Report for European Application No. 16175760.4 dated Nov. 16, 2016.
European Search Report for Application No. 16178207.3 dated Nov. 21, 2016.
European Search Report for European Application No. 16202876.5 dated Apr. 24, 2017.
European Search Report for European Application No. 16180657.5 dated Dec. 16, 2016.
European Search Report for EP Application No. 17160816.9 dated Jul. 21, 2017.
European Search Report for European Application No. 17191941.8 dated Feb. 12, 2018.
European Search Report for European Application No. 19190401.0 dated Oct. 18, 2019.

GAS TURBINE ENGINE WITH INTERCOOLED COOLING AIR AND TURBINE DRIVE

CROSS REFERENCE TO RELATED APPLICATION

This application is a continuation of U.S. patent application Ser. No. 15/269,014 filed on Sep. 19, 2016.

BACKGROUND OF THE INVENTION

This application relates to a gas turbine engine wherein cooling air passes through a boost compressor to be delivered to a turbine section for cooling.

Gas turbine engines are known and typically include a fan delivering air into a bypass duct as propulsion air and into a compressor as core air. The air is compressed in the compressor and delivered into a combustor where it is mixed with fuel and ignited. Products of this combustion pass downstream over turbine rotors driving them to rotate. The turbine rotors, in turn, drive the compressor and fan rotor.

As known, the turbine components see very high temperatures. As such, it is known to deliver cooling air to the turbine.

Historically, the fan rotor rotated as one with a fan drive turbine. However, more recently, a gear reduction is placed between the fan rotor and the fan drive turbine. With this change, the fan may rotate at slower speeds than the fan drive turbine. This allows a designer to increase the speed of the fan drive turbine. This increase results in higher temperatures in the turbine section.

The higher temperatures raise cooling challenges. The higher temperatures also results in higher pressures at an upstream end of the turbine section. This is where one branch of the cooling air is typically delivered. As such, the cooling air must be at a sufficiently high pressure that it can move into this environment.

Historically, air from near a downstream end of the compressor section has been tapped to provide cooling air. However, with the move to a geared gas turbine engine, the efficient use of all air delivered into the core engine becomes more important. As such, utilizing air which has already been fully compressed is undesirable.

Recently, it has been proposed to tap the cooling air from a location upstream of the downstream most location in the compressor. This air is then passed through a boost compressor, which increases its pressure such that it now can move into the turbine section.

SUMMARY OF THE INVENTION

In a featured embodiment, a gas turbine engine has a compressor section with a downstream most end and a cooling air tap at a location spaced upstream from the downstream most end. The cooling air tap is passed through at least one boost compressor and at least one heat exchanger, and then passed to a turbine section to cool the turbine section. The boost compressor is driven by a driveshaft which is driven by the turbine section. A boost turbine selectively drives the boost compressor.

In another embodiment according to the previous embodiment, a clutch is positioned between the boost turbine and the boost compressor. The clutch is selectively opened or closed to provide the selective drive of the boost compressor by the boost turbine.

In another embodiment according to any of the previous embodiment, when the boost turbine is driving the boost compressor, rotation passes back into the driveshaft.

In another embodiment according to any of the previous embodiment, a second clutch is provided between the driveshaft and the boost compressor, such that both the driveshaft and the boost turbine can be selectively connected or disconnected, from the boost compressor.

In another embodiment according to any of the previous embodiment, there are a plurality of the heat exchangers, with a first heat exchanger between the cooling air tap and the boost compressor and a second heat exchanger downstream of the boost compressor.

In another embodiment according to any of the previous embodiment, the heat exchangers are in a bypass duct and cooled by bypass air from a fan rotor.

In another embodiment according to any of the previous embodiment, a mixing valve receives air downstream of the boost compressor and selectively receives air from a location, which has been compressed by the compressor section to a pressure higher than a pressure of the cooling air tap, and the mixing valve controlling a mixture of the airflow downstream of the boost compressor, and the air from the location to selectively deliver a mixture of the two airflows to the turbine section.

In another embodiment according to any of the previous embodiment, the boost turbine receives air from a location which has been compressed to a higher pressure than the location wherein the cooling air is tapped.

In another embodiment according to any of the previous embodiment, a fan rotor is included and the fan rotor being driven by a fan drive turbine in the turbine section through a gear reduction.

In another embodiment according to any of the previous embodiment, the air driving the boost turbine is air from an air cycle machine system associated with an aircraft that includes the gas turbine engine.

In another embodiment according to any of the previous embodiment, an over speed clutch is placed between the driveshaft and the boost compressor, such that if the boost turbine rotates at a higher speed than a drive input from the driveshaft, the over speed clutch will disconnect the driveshaft from the boost compressor.

In another embodiment according to any of the previous embodiment, there are two of the heat exchangers, with a first heat exchanger between the cooling air tap and the boost compressor and a second heat exchanger downstream of the boost compressor.

In another embodiment according to any of the previous embodiment, the heat exchangers are in a bypass duct and cooled by bypass air from a fan rotor.

In another embodiment according to any of the previous embodiment, a mixing valve receives air downstream of the boost compressor and selectively receives air from a location, which has been compressed by the compressor section to a pressure higher than a pressure of the cooling air tap, and the mixing valve controlling a mixture of the airflow downstream of the boost compressor, and the air from the location to selectively deliver a mixture of the two airflows to the turbine section.

In another embodiment according to any of the previous embodiment, the boost turbine receives air from a location which has been compressed to a higher pressure than the location wherein the cooling air is tapped.

In another embodiment according to any of the previous embodiment, a fan rotor is included and the fan rotor being driven by a fan drive turbine in the turbine section through a gear reduction.

In another embodiment according to any of the previous embodiment, the air driving the boost turbine is air from an air cycle machine system associated with an aircraft that includes the gas turbine engine.

In another embodiment according to any of the previous embodiment, a mixing valve receives air downstream of the boost compressor and selectively receives air from a location, which has been compressed by the compressor section to a pressure higher than a pressure of the cooling air tap, and the mixing valve controlling a mixture of the airflow downstream of the boost compressor, and the air from the location to selectively deliver a mixture of the two airflows to the turbine section.

In another embodiment according to any of the previous embodiment, the boost turbine receives air from a location which has been compressed to a higher pressure than the location wherein the cooling air is tapped.

In another embodiment according to any of the previous embodiment, the boost turbine receives air from a location which has been compressed to a higher pressure than the location wherein the cooling air is tapped.

These and other features may be best understood from the following drawings and specification.

DETAILED DESCRIPTION

Figure 1:
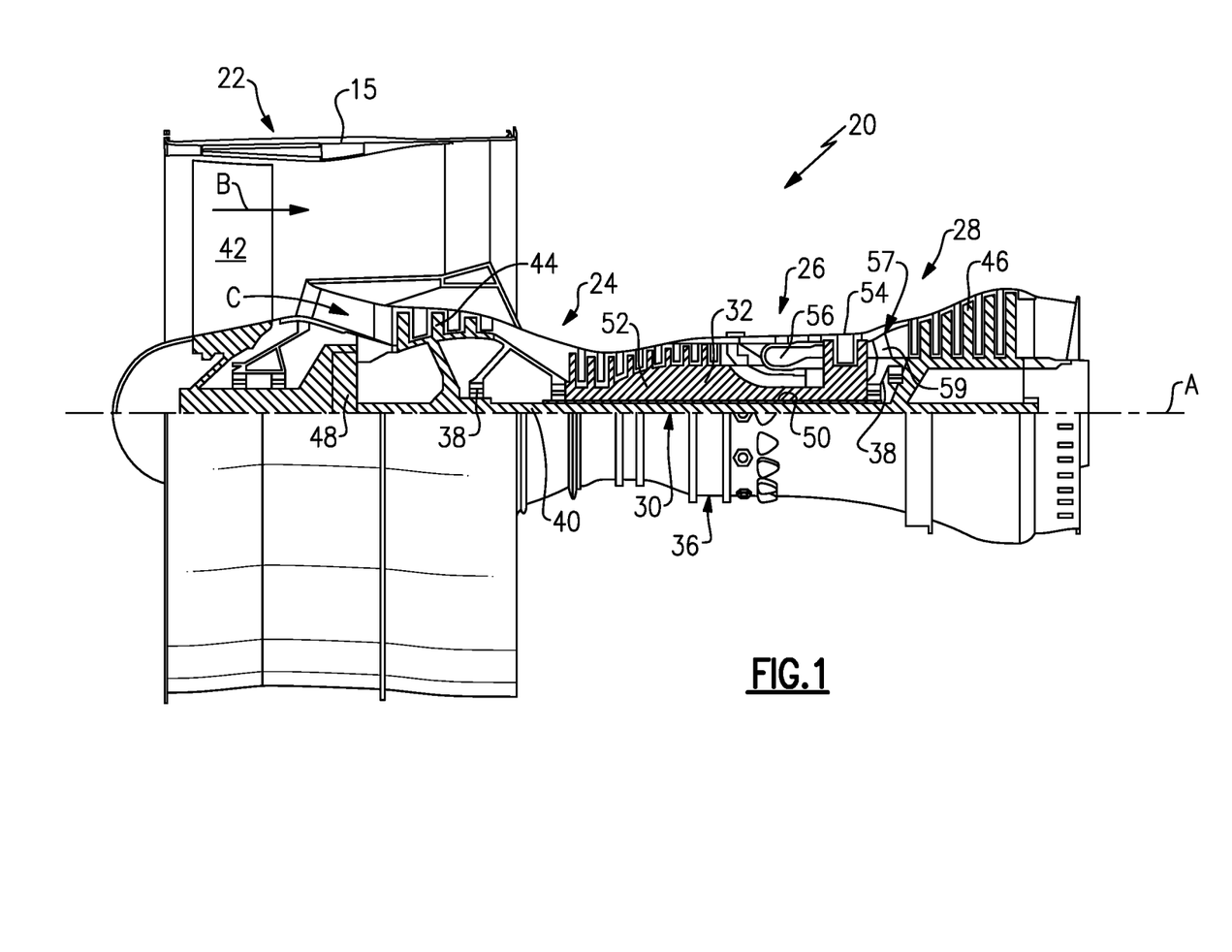
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
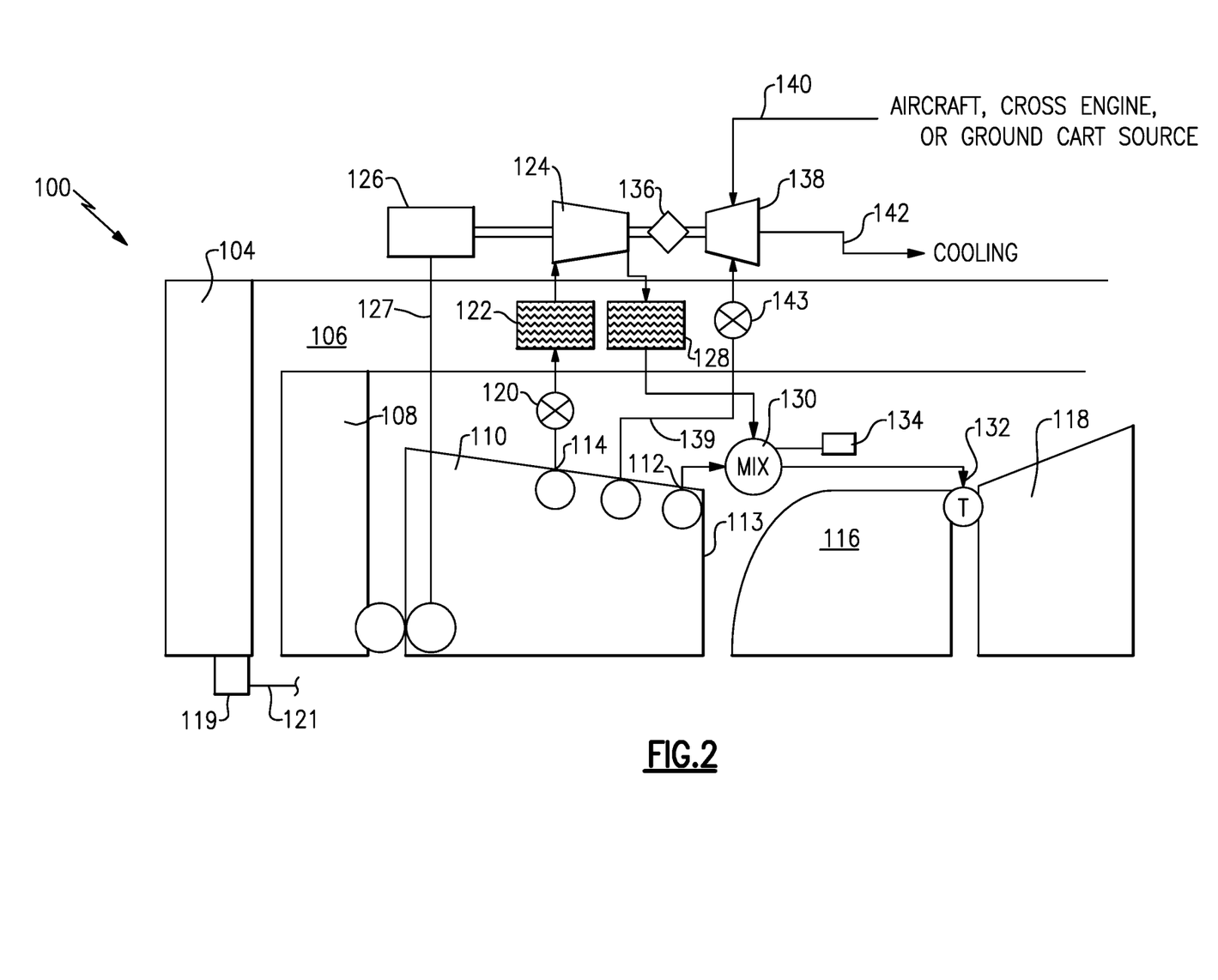
FIG. 2 schematically shows a first embodiment.

Gas turbine engine 100 is illustrated in FIG. 2. A fan 104 delivers air into a bypass duct 106 as propulsion air. The fan 104 also delivers air to a low pressure compressor 108. The air then passes into a high pressure compressor 110. A tap 112 is shown in the high pressure compressor adjacent a downstream most end 113 of the compressor. Another tap 114 is shown at a location upstream of the downstream most end 113. Air compressed by the compressor 110 passes into a combustor 116. The air is mixed with fuel and ignited and products of this combustion pass over a high pressure turbine 118. In this embodiment, there will typically be at least a second turbine stage. In some embodiments, there may be a third turbine stage which drives the fan 104. A gear reduction 119 is shown between a shaft 121 driven by a fan drive turbine (which may be the second turbine or the third turbine, if one is included).

Air from the tap 114 is utilized as cooling air. It passes through a valve 120 to a heat exchanger 122. The air in the heat exchanger 122 is cooled by the bypass air in duct 106. Of course, other locations for the heat exchanger may be selected. Downstream of the heat exchanger 122 air passes through a boost compressor 124. The boost compressor 124 is driven by an accessory driveshaft or takeoff shaft 127 through a gearbox 126. Shaft 127 may be driven by the high pressure turbine 118.

Air downstream of the boost compressor 124 passes through a heat exchanger 128, and then to a mixing chamber 130. It should be understood that while two heat exchangers 122 and 128 are illustrated, only one heat exchanger may be needed. In the mixing chamber 130, air from the downstream location 112 is mixed with the air from the location 114 to arrive at a desired mix of temperature and pressure to be delivered at line 132 to cool the high pressure turbine 118.

As an example, at lower power operation, more air from the downstream most location 112 may be utilized with limited disadvantage to efficiency. The mixing chamber 130 may be a passive orifice feature. As long as the pressure downstream of the boost compressor is higher than the air from location 112, the boost compressor air will flow for cooling. Air from the tap 112 will make up any difference in the required flow volume. A control 134 controls the mixing chamber 130. It should be understood that the other valves and other items, such as the clutches described below, would also be controlled by the control 134. Control 134 may be a standalone control or may be part of a full authority digital electronic controller (FADEC).

A clutch 136 is placed between the boost compressor 124 and a turbine 138. The turbine 138 is shown receiving driving air from a source 140. The source 140 could be another aircraft air source, such as an air cycle machine, a ground cart source, a cross engine source, or any other source of pressurized air. The pressurized air 140 drives the turbine 138 to, in turn, provide drive to the boost compressor 124 when the clutch 136 is closed. The driving air 140, after driving the turbine 138, passes to a use 142, which may also be a cooling use.

When the clutch 136 is closed, the boost compressor 124 is driven and rotation passes back though the gearbox 126 to help power a spool of the gas turbine engine which would typically drive the accessory driveshaft 127. In one embodiment, the accessory driveshaft 127 may be driven along with the high pressure spool, which includes the high pressure compressor 110 and the high pressure turbine 118. With this embodiment, the energy lost from bleeding air at locations 112 or 114 may be somewhat recaptured by the energy recirculated into the gearbox 126.

As is also shown, a tap 139 may come from a location in the compressor 110, such as a location intermediate locations 112 and 114. This could be utilized as the driving air. A valve 143 controls this airflow.

Returning to FIG. 2, when it is not desired to have the turbine 138 utilized to drive the boost compressor 124, the clutch 136 is open to reduce any turbine drag on the boost compressor 124. A worker of ordinary skill in this art would recognize when to select from the drive sources.

Figure 3:
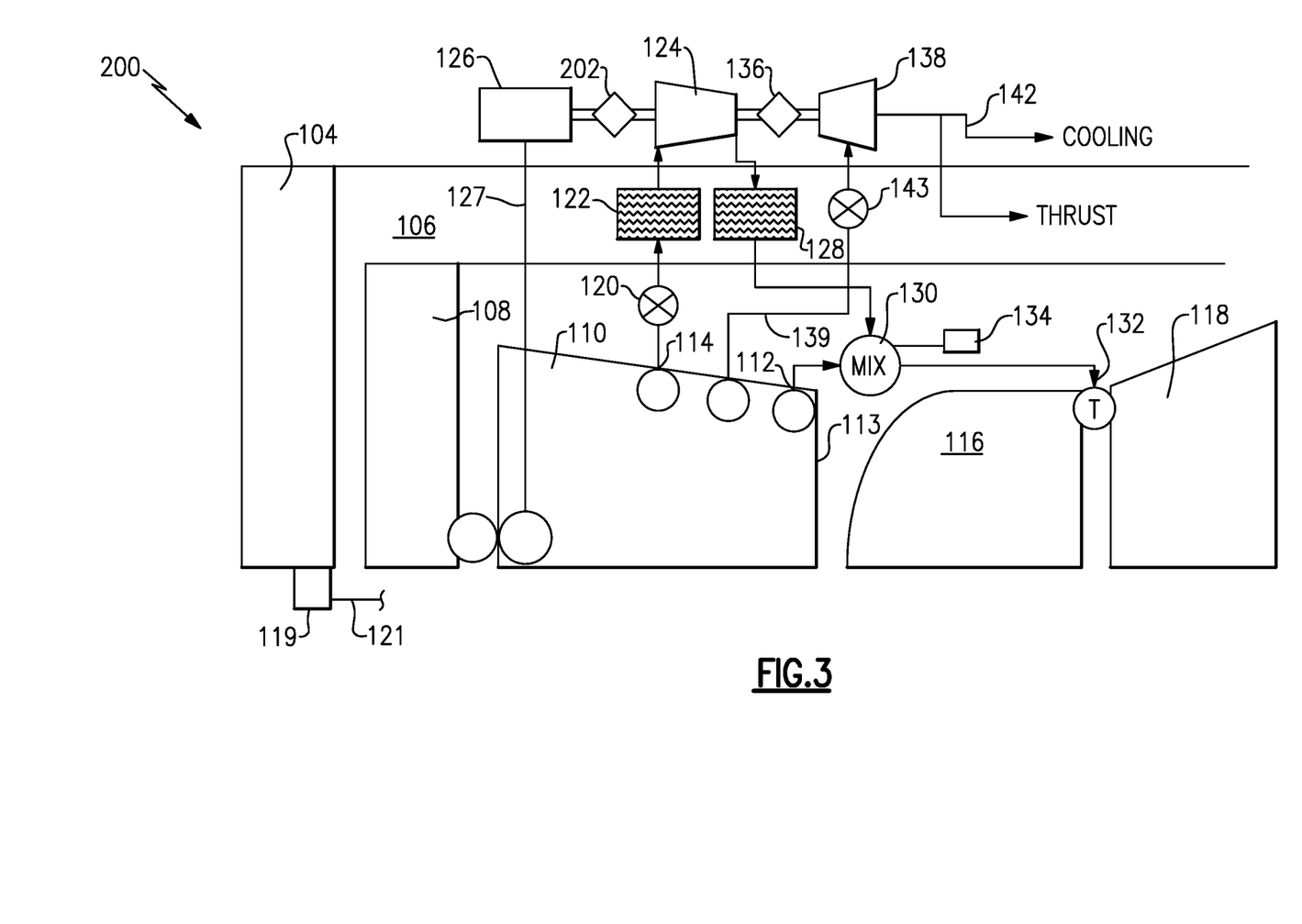
FIG. 3 schematically shows a second embodiment.

FIG. 3 shows another embodiment 200. Embodiment 200 is similar to embodiment 100 except an additional clutch 202 is placed between the boost compressor 124 and the gearbox 126. This clutch is opened when the turbine 138 is providing sufficient power to power the boost compressor 124.

The clutches 202 and 136 are controlled by the control 134 such that an optimal drive for the boost compressor 124 is selected.

Figure 4:
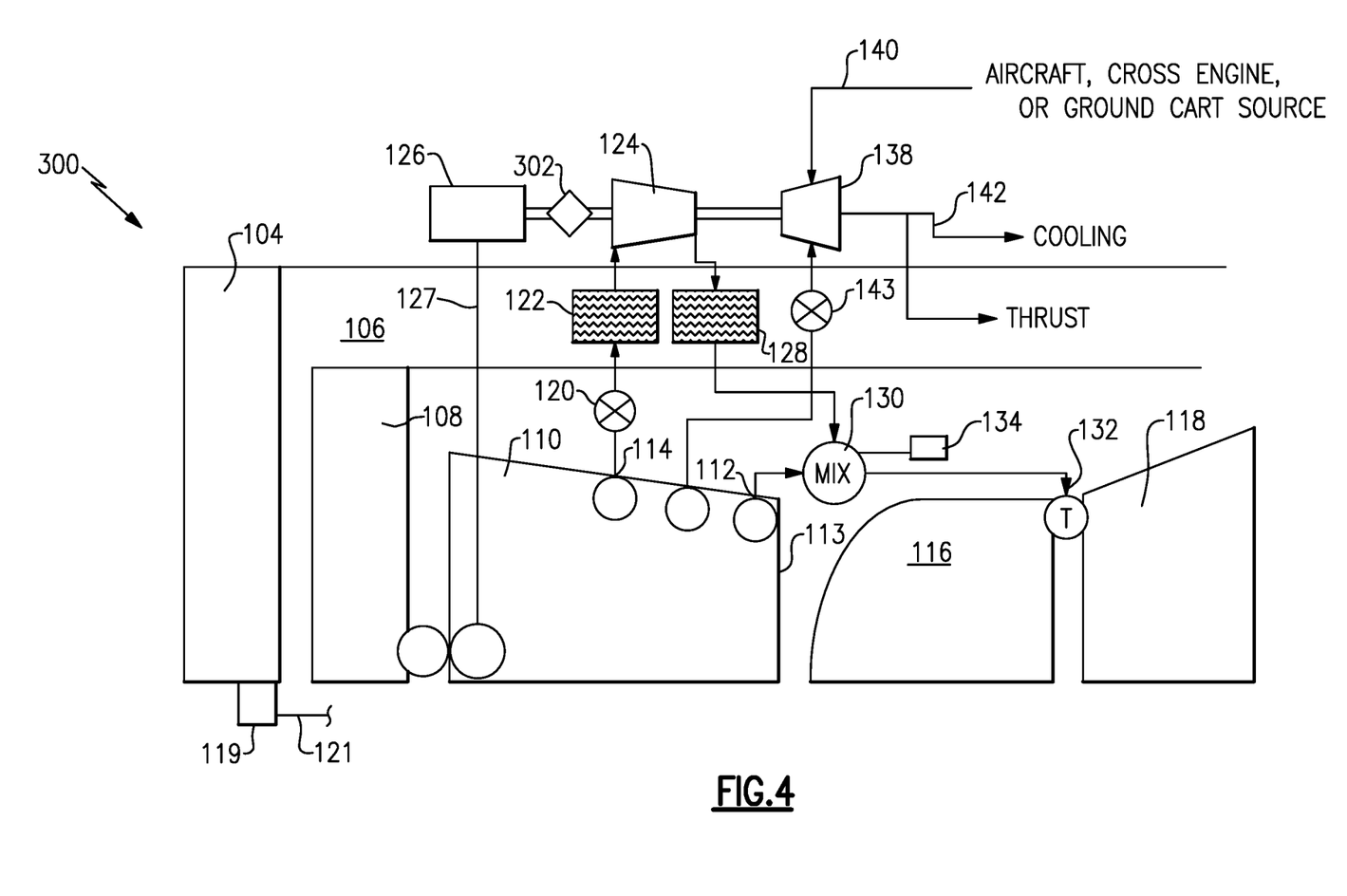
FIG. 4 schematically shows a third embodiment.

FIG. 4 shows yet another embodiment 300. Embodiment 300 is somewhat similar to embodiment 200, except that the clutch 136 may be eliminated and an over speed clutch 302 placed between the gearbox 126 and the boost compressor 124. If the gearbox 126 is rotating at a higher speed than the turbine, the gearbox 126 will drive boost compressor 124. On the other hand, when the turbine 138 is operational and is rotating at a higher speed than the drive input from gearbox 126, the over speed clutch 302 will disconnect the gearbox 126 from the boost compressor 124.

Although embodiments of this invention have been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a compressor section having a downstream most end and a cooling air tap at a tap location spaced upstream from said downstream most end;
said cooling air tap air being passed through at least one boost compressor and at least one heat exchanger, and then passed to a turbine section to cool said turbine section, said boost compressor being driven by a driveshaft which is driven by said turbine section, and a boost turbine for selectively driving said boost compressor;
a clutch positioned between said boost turbine and said boost compressor and said clutch being selectively opened or closed to provide said selective drive of said boost compressor by said boost turbine; and
wherein a fan rotor is included and said fan rotor being driven by a fan drive turbine in said turbine section through a gear reduction.

2. The gas turbine engine as set forth in claim 1, wherein when said boost turbine is driving said boost compressor, rotation passes back into said driveshaft.

3. The gas turbine engine as set forth in claim 2, wherein a second clutch is provided between the driveshaft and said boost compressor, such that both said driveshaft and said boost turbine can be selectively connected or disconnected, from said boost compressor.

4. The gas turbine engine as set forth in claim 1, wherein said boost turbine receives air from a higher pressure location which has been compressed to a higher pressure than said location wherein said cooling air is tapped.

5. The gas turbine engine as set forth in claim 1, wherein the air driving said boost turbine is air from an air cycle machine system associated with an aircraft that includes the gas turbine engine.

6. The gas turbine engine as set forth in claim 1, wherein the at least one heat exchanger comprises two of said heat exchangers, with a first heat exchanger between said cooling air tap and said boost compressor and a second heat exchanger downstream of said boost compressor.

7. The gas turbine engine as set forth in claim 6, wherein said heat exchangers are in a bypass duct and cooled by bypass air from a fan rotor.

8. The gas turbine engine as set forth in claim 6, wherein a mixing valve receives air compressed by said boost compressor and selectively receives higher pressure air from a higher pressure location, which has been compressed by said compressor section to a pressure higher than a pressure of said cooling air tap, and said mixing valve controlling a mixture of said air compressed by said boost compressor, and said higher pressure air from said higher pressure location to selectively deliver said mixture of said two airflows to said turbine section.

9. The gas turbine engine as set forth in claim 6, wherein said boost turbine receives air from a higher pressure location which has been compressed to a higher pressure than said location wherein said cooling air is tapped.

10. The gas turbine engine as set forth in claim 6, wherein the air driving said boost turbine is air from an air cycle machine system associated with an aircraft that includes the gas turbine engine.

11. The gas turbine engine as set forth in claim 1, wherein a mixing valve receives air compressed by said boost compressor and selectively receives higher pressure air from a higher pressure location, which has been compressed by said compressor section to a pressure higher than a pressure of said cooling air tap, and said mixing valve controlling a mixture of said air compressed by said boost compressor, and said higher pressure air from said higher pressure location to selectively deliver said mixture of said two airflows to said turbine section.

12. The gas turbine engine as set forth in claim 11, wherein said boost turbine receives air from a location which has been compressed to a higher pressure than said location wherein said cooling air is tapped.

13. A gas turbine engine comprising:
a compressor section having a downstream most end and a cooling air tap at a tap location spaced upstream from said downstream most end;
said cooling air tap air being passed through at least one boost compressor and at least one heat exchanger, and then passed to a turbine section to cool said turbine section, said boost compressor being driven by a driveshaft which is driven by said turbine section, and a boost turbine for selectively driving said boost compressor;
a clutch positioned between said boost turbine and said boost compressor and said clutch being selectively opened or closed to provide said selective drive of said boost compressor by said boost turbine; and
wherein a second clutch is provided between the driveshaft and said boost compressor, such that both said driveshaft and said boost turbine can be selectively connected or disconnected, from said boost compressor.

14. The gas turbine engine as set forth in claim 13, wherein the at least one heat exchanger comprises a plurality of said heat exchangers, with a first heat exchanger between said cooling air tap and said boost compressor and a second heat exchanger downstream of said boost compressor.

15. The gas turbine engine as set forth in claim 14, wherein said heat exchangers are in a bypass duct and cooled by bypass air from a fan rotor.

16. The gas turbine engine as set forth in claim 15, wherein a mixing valve receives air compressed by said boost compressor and selectively receives higher pressure air from a higher pressure location, which has been compressed by said compressor section to a pressure higher than a pressure of said cooling air tap, and said mixing valve controlling a mixture of said air compressed by said boost compressor, and said higher pressure air from said higher pressure location to selectively deliver said mixture of said two airflows to said turbine section.

17. The gas turbine engine as set forth in claim 13, wherein a fan rotor is included and aid fan rotor being driven by a fan drive turbine in said turbine section through a gear reduction.

18. The gas turbine engine as set forth in claim 13, wherein said boost turbine receives air from a location which has been compressed to a higher pressure than said location wherein said cooling air is tapped.

19. A gas turbine engine comprising:
a compressor section having a downstream most end and a cooling air tap at a tap location spaced upstream from said downstream most end;
said cooling air tap air being passed through at least one boost compressor and at least one heat exchanger, and then passed to a turbine section to cool said turbine section, said boost compressor being driven by a driveshaft which is driven by said turbine section, and a boost turbine for selectively driving said boost compressor;
a clutch positioned between said boost turbine and said boost compressor and said clutch being selectively opened or closed to provide said selective drive of said boost compressor by said boost turbine; and
wherein a mixing valve receives air compressed by said boost compressor and selectively receives higher pressure air from a higher pressure location, which has been compressed by said compressor section to a pressure higher than a pressure of said cooling air tap, and said mixing valve controlling a mixture of said air compressed by said boost compressor, and said higher pressure air from said higher pressure location to selectively deliver said mixture of said two airflows to said turbine section.

* * * * *